(12) United States Patent
   Higgins

(10) Patent No.: US 10,507,770 B2
(45) Date of Patent: Dec. 17, 2019

(54) BICYCLE CARRIERS

(71) Applicant: GO FLAT RACK LIMITED, Auckland (NZ)

(72) Inventor: David John Higgins, Auckland (NZ)

(73) Assignee: GO FLAT RACK LIMITED, Auckland (NZ)

( * ) Notice: Subject to any disclaimer, the term of this patent is extended or adjusted under 35 U.S.C. 154(b) by 0 days.

(21) Appl. No.: 15/742,860

(22) PCT Filed: Jul. 11, 2016

(86) PCT No.: PCT/NZ2016/050114
   § 371 (c)(1),
   (2) Date: Jan. 8, 2018

(87) PCT Pub. No.: WO2017/007343
   PCT Pub. Date: Jan. 12, 2017

(65) Prior Publication Data
   US 2018/0201201 A1    Jul. 19, 2018

(30) Foreign Application Priority Data
   Jul. 9, 2015 (NZ) ........................................ 709866

(51) Int. Cl.
   *B60R 9/00*    (2006.01)
   *B60R 9/10*    (2006.01)
   (Continued)

(52) U.S. Cl.
   CPC ................ *B60R 9/10* (2013.01); *B60R 9/045* (2013.01); *B62H 3/08* (2013.01)

(58) Field of Classification Search
   CPC .............. B60R 9/10; B60R 9/045; B62H 3/08
   (Continued)

(56) References Cited

U.S. PATENT DOCUMENTS

| | | | | |
|---|---|---|---|---|
| 4,958,761 | A | * | 9/1990 | Tenney ..................... B60R 9/05 224/316 |
| 5,275,319 | A | * | 1/1994 | Ruana ...................... B60R 9/05 224/316 |

(Continued)

OTHER PUBLICATIONS www.dachbox.org [online] "2019 Fischer 18092 Dachlift Experteneinschätzung" [retrieved Oct. 6, 2019]. Retrieved from the internet; URL <https://www.dachbox.org/fischer/18092-dachlift/> 3 pages.

(Continued)

*Primary Examiner* — Peter N Helvey
(74) *Attorney, Agent, or Firm* — Lowe Graham Jones PLLC

(57) ABSTRACT

The invention disclosed is a bicycle carrying rack to mount to a vehicle. The rack has first mounting portion to connect to a load carrier of the vehicle, and a fork mounting portion including a fork receiving portion. The fork mounting portion is rotationally mounted about a first axis from the first mounting portion. The fork receiving portion receives and locks to a fork of the bicycle. The fork mounting portion has, a first position adapted to locate the bicycle in a substantially vertical position, with the fork aligned in a substantially straight ahead position relative a major plane of the bicycle, and a second position adapted to locate the bicycle, in or toward a horizontal position, with the fork aligned at an angle turned away from the substantially straight ahead position. During the movement from the first position to the second position the fork receiving portion rotates about a second axis to rotate the fork away from the substantially straight ahead position, and vice versa when rotated from the second position to the first position. There is also at least one lock to lock the bicycle at least in the first position, so that a bicycle can be carried in either said first position or said second position.

29 Claims, 17 Drawing Sheets

(51) Int. Cl.
*B62H 3/08* (2006.01)
*B60R 9/045* (2006.01)

(58) Field of Classification Search
USPC .......................................................... 224/310
See application file for complete search history.

(56) References Cited

U.S. PATENT DOCUMENTS

| | | | | | |
|---|---|---|---|---|---|
| 5,284,282 | A * | 2/1994 | Mottino | .................. | B60R 9/042 224/310 |
| 5,360,150 | A * | 11/1994 | Praz | ........................ | B60R 9/042 224/280 |
| 5,360,151 | A * | 11/1994 | Fine | ........................ | B60R 9/042 224/309 |
| 5,421,495 | A * | 6/1995 | Bubik | ..................... | B60R 9/042 224/282 |
| 5,505,579 | A * | 4/1996 | Ray | ........................ | B60P 3/1025 224/310 |
| 5,709,521 | A * | 1/1998 | Glass | ..................... | B60R 9/042 224/310 |
| 5,850,891 | A * | 12/1998 | Olms | .................... | B60R 9/0423 182/127 |
| 6,015,074 | A * | 1/2000 | Snavely | .................. | B60R 9/042 224/310 |
| 6,131,781 | A * | 10/2000 | Murray | .................. | B60R 9/042 224/309 |
| 6,149,039 | A * | 11/2000 | Englander | ............... | B60R 9/042 224/310 |
| 6,425,507 | B1 * | 7/2002 | Allen | ........................ | B60R 9/05 224/309 |
| 6,561,396 | B2 * | 5/2003 | Ketterhagen | ........... | B60R 9/042 224/310 |
| 6,634,529 | B2 * | 10/2003 | Choiniere | ............... | B60R 9/042 224/310 |
| 6,681,970 | B2 * | 1/2004 | Byrnes | .................... | B60R 9/042 224/310 |
| 6,938,782 | B2 * | 9/2005 | Dean | ........................ | B60R 9/048 211/17 |
| 7,410,082 | B2 * | 8/2008 | Stewart | ..................... | B60R 9/10 224/504 |
| 2002/0125281 | A1 * | 9/2002 | Byrnes | .................... | B60R 9/042 224/310 |
| 2004/0025810 | A1 * | 2/2004 | Davis | ........................ | F01B 1/12 123/41.7 |
| 2006/0163296 | A1 * | 7/2006 | McMillan | ................. | B60R 9/05 224/319 |
| 2007/0175936 | A1 * | 8/2007 | Goyanko | ................ | B60R 9/042 224/309 |

OTHER PUBLICATIONS www.singletrackworld.com [online] "2014 Laid-back roof rack: what say you all?" [retrieved Oct. 6, 2019]Retrieved from the internet; URL <https://singletrackworld.com/2014/10/laid-back-roof-rack-what-say-you-all/> 15 pages.

* cited by examiner

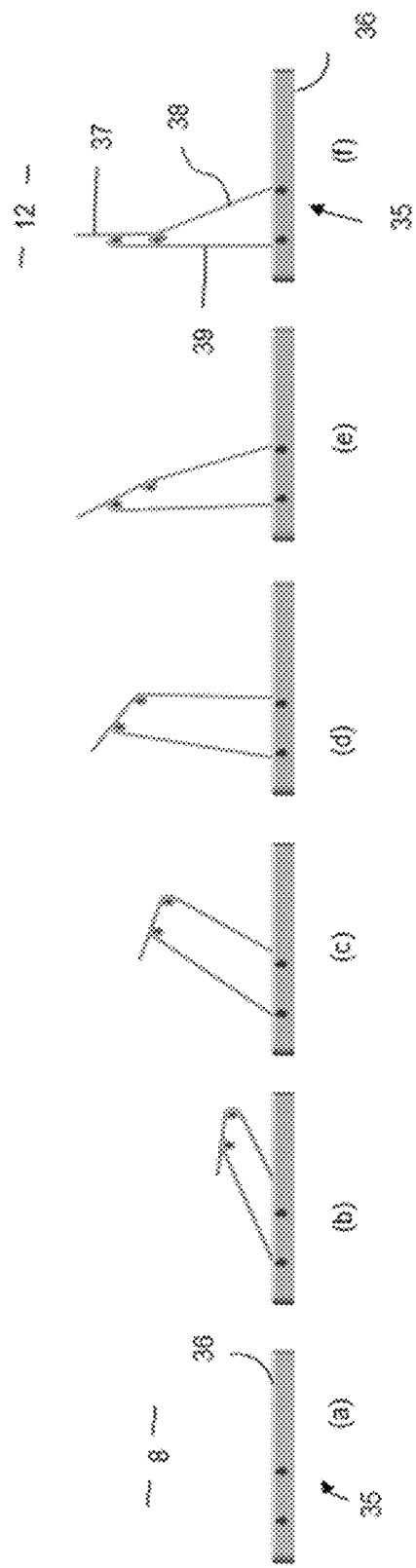

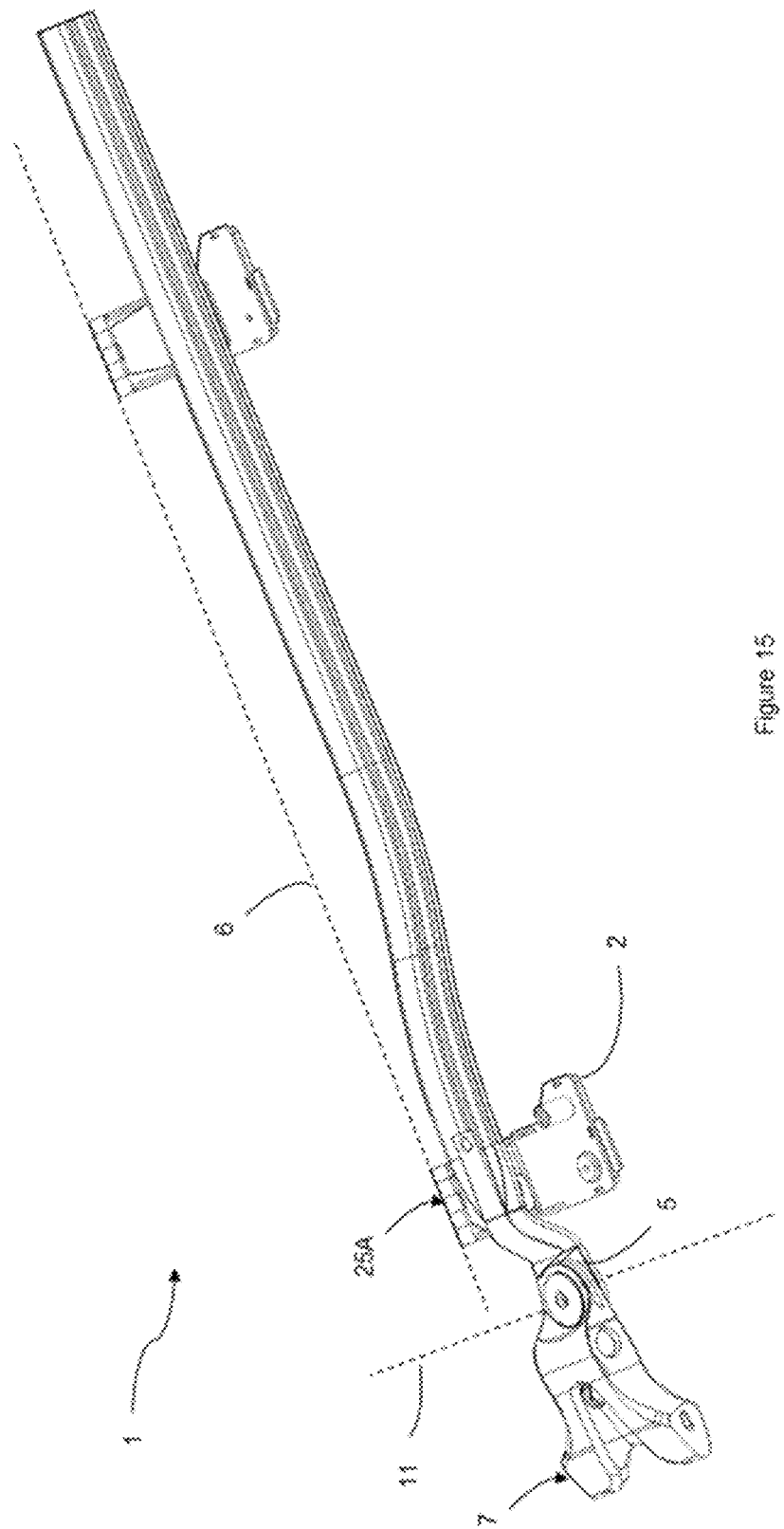

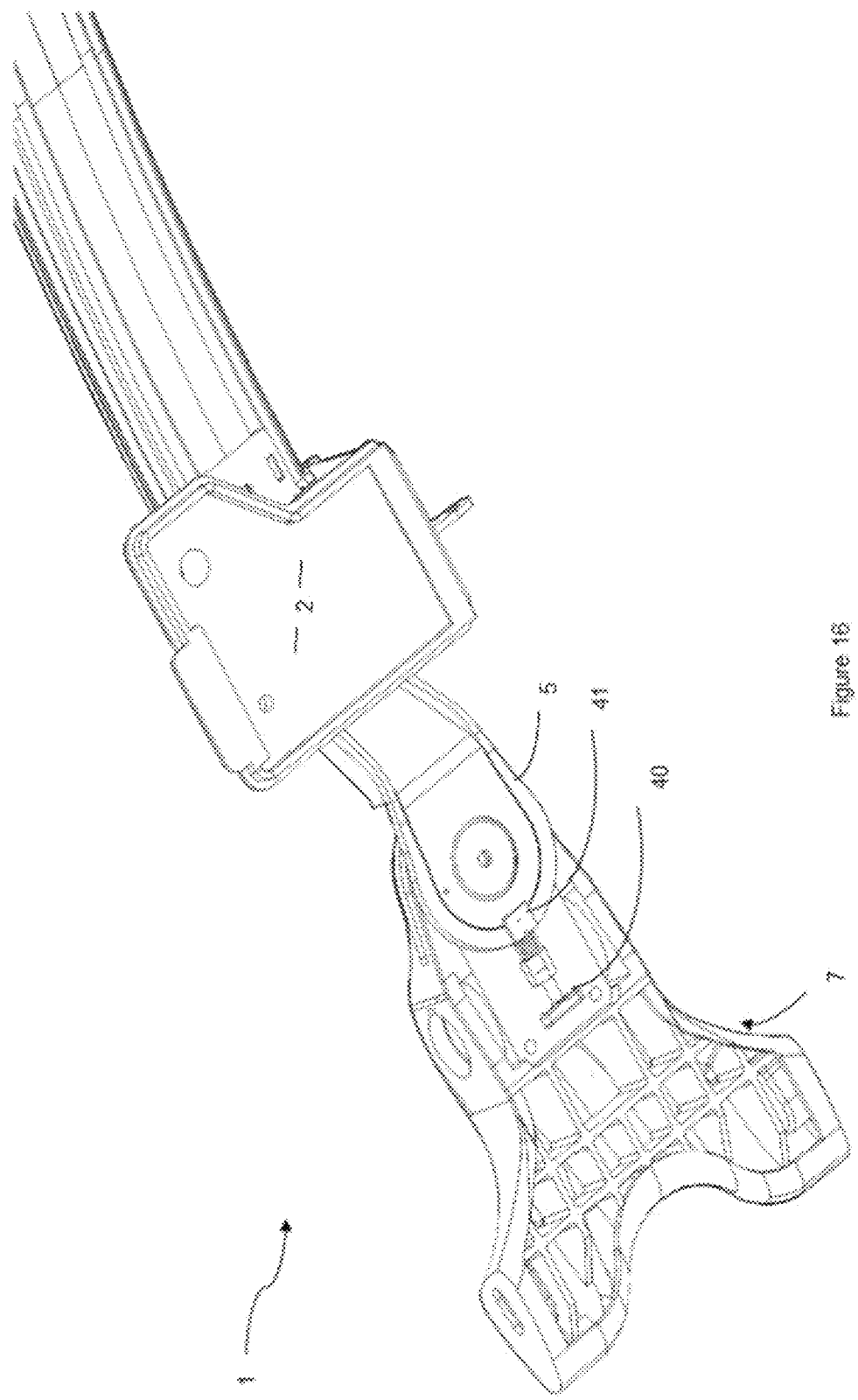

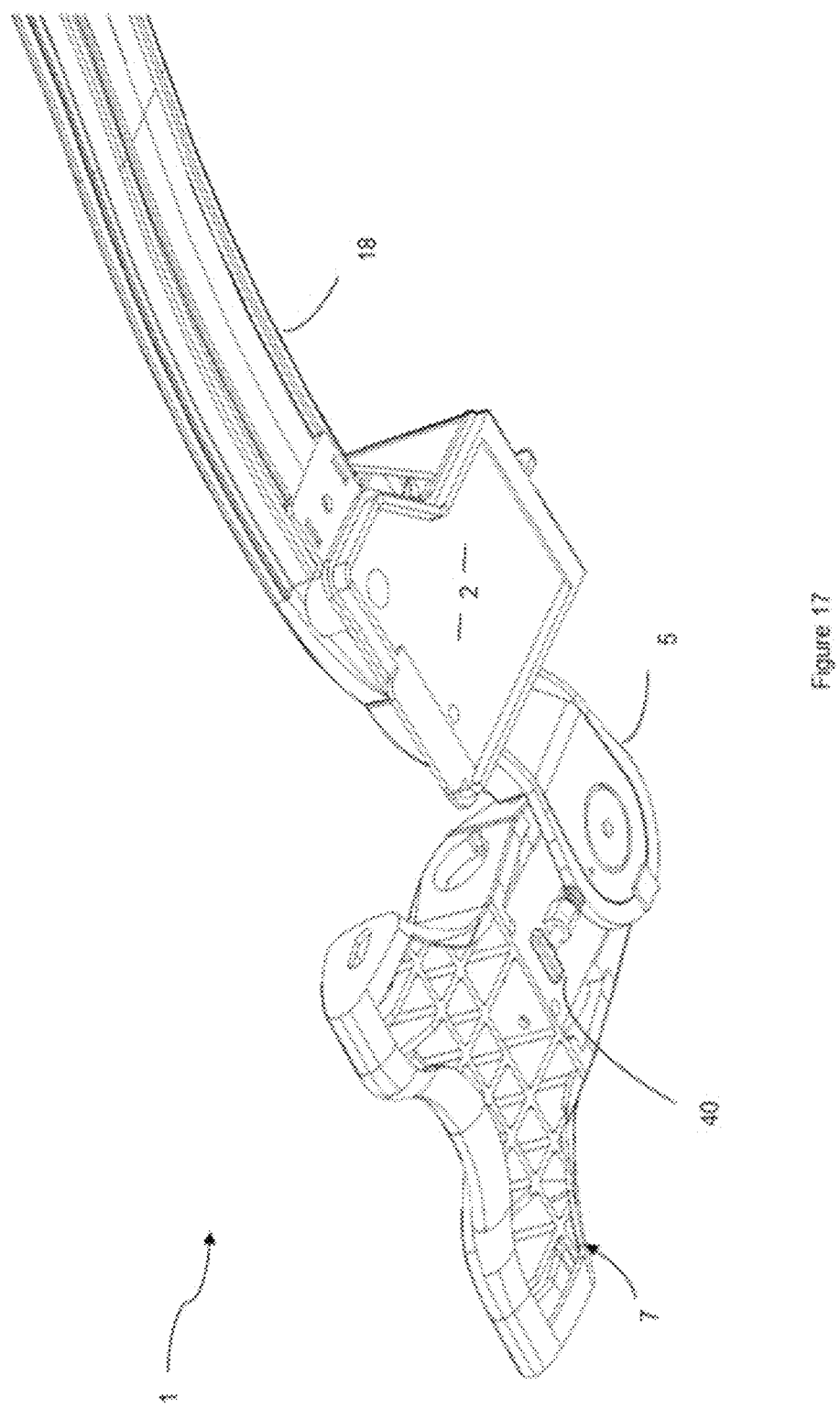

BICYCLE CARRIERS

TECHNICAL FIELD OF THE INVENTION

The present invention relates to bicycle carriers.

In particular, though not solely, the present invention is directed to a bicycle rack that can carry a bicycle in an upright or laid-over position.

BACKGROUND OF THE INVENTION

The modern bicycle in its many forms can be difficult to carry.

An advantage of carrying bicycles on the rear of a vehicle, for example by using a load carrier mounted to a towbar or hitch, is ease of loading and unloading. However, when loaded onto the back of a vehicle, it can leave the bicycle vulnerable in a collision from the rear. Also as it is at road level it is easier for people to tamper with the bicycle or steal it. A further disadvantage of loading on the back of a vehicle is the bikes are in the aerodynamic wake of the vehicle, therefore they will collect dust and road grime from the vehicle and road. A further disadvantage is that access to the boot area of the vehicle is prevented or compromised, unless the additional complexity, and cost, of a tilting rear carrier is added.

An advantage of carrying bicycles on the roof of a vehicle, for example by using a load carrier mounted from the roof, is the security from tampering, or from an accident, as the bicycle is up high. However, this mode of carrying has the disadvantage of making the vehicle higher than normal such that is cannot fit into most carparks or garages. A further disadvantage is potential damage to the bicycle should the driver forget the bicycle is mounted to the roof and then drives into a garage or carpark. This can damage both the bicycle and the car, and possibly the garage or carpark building. A further disadvantage is the increased aerodynamic resistance of the upright bicycle, which will increase fuel consumption.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved bicycle carrying rack, or to overcome the above shortcomings or address the above desiderata, or to at least provide the public with a useful choice.

BRIEF DESCRIPTION OF THE INVENTION

In a first aspect the present invention may be said to broadly consist in a bicycle carrying rack adapted for mounting to, or from, a vehicle, comprising or including,
  A first mounting portion to connect to a load carrier of the vehicle,
  A fork mounting portion including a fork receiving portion, the fork mounting portion rotationally mounted about a first axis from the first mounting portion, the fork receiving portion to receive and lock to a fork of the bicycle, wherein the fork mounting portion has,
    a first position adapted to locate the bicycle when mounted thereto, in a substantially vertical position, with the fork aligned in a substantially straight ahead position relative a major plane of the bicycle, and
    a second position adapted to locate the bicycle when mounted thereto, in or toward a horizontal position, with the fork aligned at an angle turned away from the substantially straight ahead position,
    during which movement from the first position to the second position the fork receiving portion rotates about a second axis to rotate the fork away from the substantially straight ahead position, and vice versa when rotated from the second position to the first position, and
  at least one lock to lock the bicycle at least in the first position,
such that a bicycle can be carried in either said first position or said second position.

Preferably the first axis lies in or is parallel to the major plane.

Preferably the fork receiving portion rotates about a third axis substantially perpendicular to the first axis.

Preferably there is a rear wheel mounting portion to receive and lock a rear wheel of the bicycle.

Preferably the rear wheel mounting portion is rotationally mounted about the first axis from a second mounting portion connected to the load carrier of the vehicle.

Preferably the rear wheel mounting portion is connected to the fork mounting portion by an elongate connecting member.

Preferably the rotation about the first axis is a concentric or nonconcentric rotation.

Preferably the first mounting portion and second mounting portions are connected to the respective fork mounting portion and rear wheel mounting portion by a unequal length parallelogram hinge to rotate non-concentrically about the first axis.

Preferably the unequal length parallelogram hinge lies substantially flat in the first position.

Preferably the unequal length parallelogram hinge lies upright in the second position, and due to the unequal length rotates the fork mounting portion and rear wheel mounting portion non-concentrically about the first axis in to the substantially horizontal position.

Preferably the elongate connecting member is substantially channel shaped.

Preferably the fork is held via a wheel axle receiving portion of the fork, for example the dropouts of the fork, or similar.

Preferably the movement from the first position to the second position is controlled by an energy dissipation device.

Preferably the energy dissipation device is a gas or hydraulic strut.

Preferably there is a motion control apparatus to move the fork receiving portion from the straight ahead position to the turned away position.

Preferably the motion control apparatus is a flexible tensile member mounted between the first mounting portion and the fork receiving portion via a sliding connection on the fork mounting portion, such that as the fork mounting portion rotates from the first position to the second position the flexible tensile member pulls on the fork receiving portion to cause it to rotate.

Alternatively the motion control apparatus is a geared connection between the first mounting portion, directly or indirectly to the fork receiving portion.

Preferably there is a biasing means to act at least in part against the action of the motion control means.

Preferably the biasing means is a rotary spring mounted about the rotating connection of the fork receiving portion to the fork mounting portion to aid the fork in returning to the straight ahead position when moving back to the first position.

Preferably the fork receiving portion rotates back to the straight ahead position under the weight of the fork and handle bars of the bicycle.

Preferably the second axis is parallel to, or in, the major plane of the bicycle and not parallel to the first axis.

In another aspect the present invention may be said to broadly consist in a bicycle carrying rack, adapted for mounting to or from a vehicle, comprising or including, A fork receiving portion, adapted to mount to or from a vehicle load carrier and adapted to connect to and hold a fork of a bicycle, Wherein the fork receiving portion allows the bicycle to be held in a first position with the bicycle substantially vertical, and a second position with the bicycle in or toward a horizontal position, And wherein the fork receiving portion can rotate the fork of the bicycle away from a straight-ahead position when in the first position, as it moves to the second position.

Preferably movement from the first position to the second position is a rotational movement about a first axis.

Preferably the first axis is parallel to, or in, a major plane of the bicycle.

Preferably the fork receiving portion rotates about a second axis as it rotates the fork.

Preferably the second axis is parallel to, or in, the major plane of the bicycle.

Preferably the second axis is not parallel to the first axis.

Preferably the fork receiving portion can be oriented to have the second axis match a steering axis of the fork.

Alternatively the connection to hold the fork allows relative rotation of the fork to the fork receiving portion.

Preferably there is a fork mounting portion between the fork receiving portion and the vehicle load carrier.

Preferably there is a first mounting portion connected between the vehicle load carrier and the fork mounting portion.

Preferably the fork mounting portion is rotationally connected to the first mounting portion to allow rotation about the first axis.

Preferably the fork receiving portion is rotationally connected about the second axis to the fork mounting portion.

Preferably there is a rear wheel receiving portion adapted to mount to or from the vehicle load carrier and adapted to connect to and hold a rear wheel of the bicycle, the rear wheel receiving portion able to move with the fork receiving portion between the first position and the second position.

Preferably the rear wheel receiving portion is connected to the vehicle load carrier via a second mounting portion.

Preferably the rear wheel receiving portion is rotationally connected about the first axis to the second mounting portion.

Preferably the rotation of the rear wheel receiving portion about the first axis is a concentric or nonconcentric rotation.

Preferably the first mounting portion and second mounting portions are connected to the respective fork mounting portion and rear wheel mounting portion by an unequal length parallelogram hinge to rotate non-concentrically about the first axis.

Preferably the unequal length parallelogram hinge lies substantially flat in the first position.

Preferably the unequal length parallelogram hinge lies upright in the second position, and due to the unequal length rotates the fork mounting portion and rear wheel mounting portion non-concentrically about the first axis in to the substantially horizontal position.

Preferably the fork receiving portion is operationally connected to the rear wheel receiving portion.

Preferably the operational connection is via the fork mounting portion.

Preferably the operation connection is via an elongate member between the rear wheel receiving portion and the fork mounting portion.

Preferably there is a bracket to connect a rear wheel dropout of the bicycle to the rear wheel receiving portion in the absence of the rear wheel.

In a further aspect the present invention may be said to broadly consist in a method of mounting a bicycle to a vehicle load carrier on, or for, a vehicle, comprising or including the steps of, Connecting a fork of the bicycle to a fork receiving portion of a fork mounting portion, which in turn is pivotally connected to the vehicle load carrier, Connecting a rear wheel, or rear portion of the bicycle to a rear wheel mounting portion that is also pivotally connected to the vehicle load carrier, such that the bicycle is carried in a substantially upright position with the fork in a substantially straight-ahead position, Wherein the fork receiving portion is adapted to rotate the fork, relative to the fork mounting portion about a first axis at least when the fork mounting portion pivots relative to the vehicle load carrier about a second axis, such that a bicycle may be carried in or toward a substantially horizontal position when the rotation of the fork is away from the straight-ahead position.

Preferably the rotation of the fork away from the straight ahead position is substantially 90 degrees when in the substantially horizontal position.

Preferably the rotation of the fork away from the straight ahead position rotates a handle bar of the bicycle out of the way such that the bicycle can lie horizontally with the handle bars out of the way.

In another aspect the present invention may be said to broadly consist in a bicycle carrying rack as described herein with reference to any one or more of the accompanying drawings.

In another aspect the present invention may be said to broadly consist in a method of mounting as described herein with reference to any one or more of the accompanying drawings.

In another aspect the present invention may be said to broadly consist in method of use of a bicycle carrying rack as described herein with reference to any one or more of the accompanying drawings.

In another aspect the present invention may be said to broadly consist in vehicle with a bicycle carrying rack as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Figure 1:
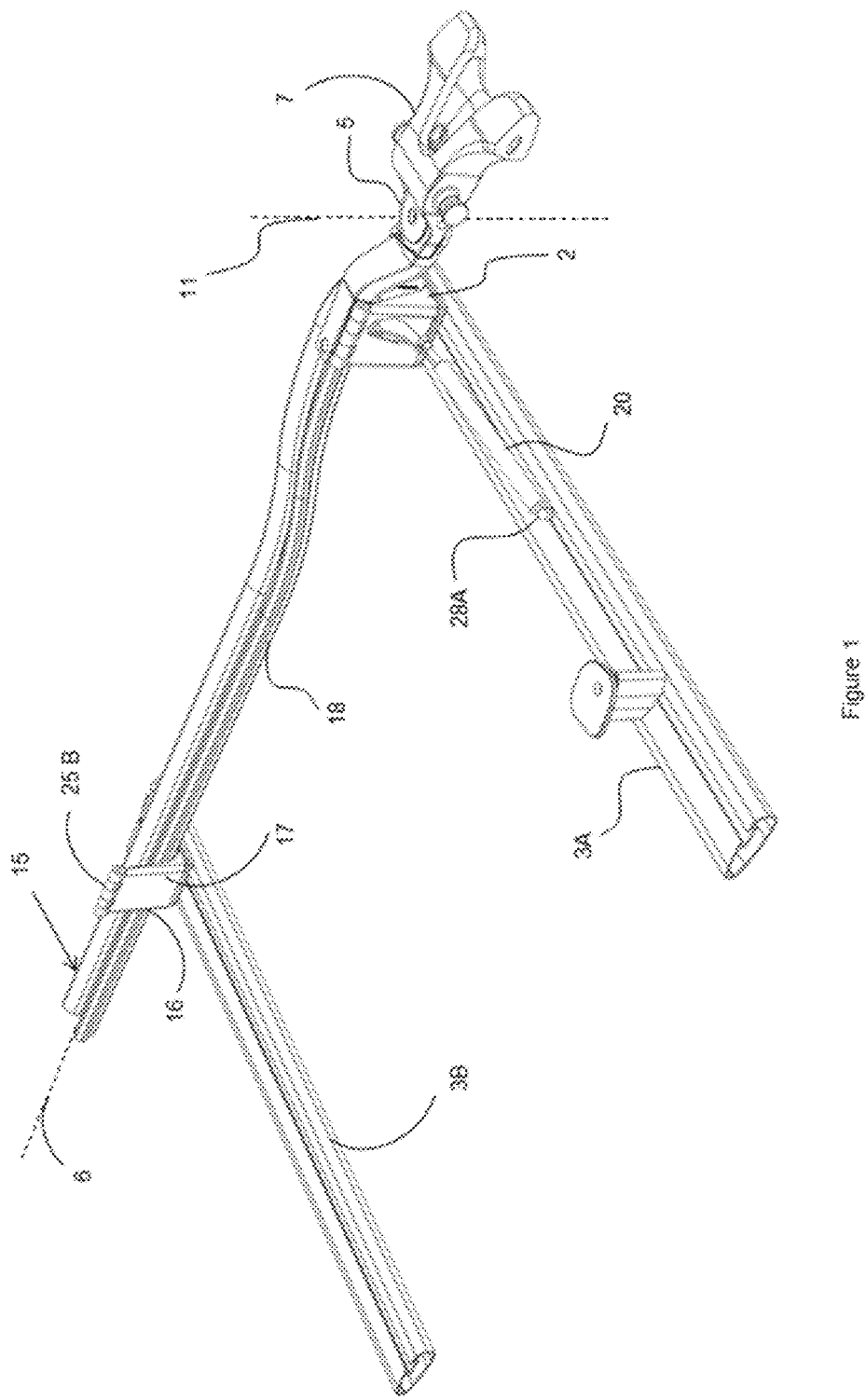
FIG. 1 Shows an isometric view of a preferred form of the bicycle rack, locked in a first position to hold the bicycle upright, FIG. 2 Shows a similar view to FIG. 1, but unlocked and inclined at about 45 degrees, the fork receiving portion rotated part way also, FIG. 3 Shows a similar view to FIG. 1, but with the bicycle rack rotated through substantially 90 degrees to a second position to hold a bicycle, if mounted thereto, substantially horizontal (or close to), FIG. 4 Shows a rear plan isometric view of the bicycle rack in a preferred form at 4A in the first position to hold the bicycle vertically, 4B half way between the first and second position, and 4C in the second position to hold the bicycle substantially horizontally, FIG. 5 Shows a close up of the fork receiving and fork mounting portions in the first position, but unlocked, FIG. 6 Shows a close up of the fork receiving and fork mounting portions in-between the first and second positions, but unlocked, FIG. 7 Shows a close up of the fork receiving and fork mounting portions in the second position, but unlocked, FIG. 8 Shows a front view of the bicycle rack as would be seen for example looking front on to a vehicle, showing at 8A the bicycle rack in the first position with a bicycle mounted in a first position, preferably vertically, from a load carrier on the roof of a vehicle, 8B the bicycle rack shown partway between the first position and the second position, and 8C the bicycle rack and bicycle in the second position, which in the preferred form is a substantially horizontal position, FIG. 9 Shows an exploded view of the bicycle carrying rack, FIG. 10 Shows an exploded isometric view of the fork mounting area of the rack, FIG. 11 Shows a similar view to FIG. 10, but from the opposite side, FIG. 12 Shows in a series of isometric views (a) through (e) an isometric view of the unequal length parallelogram in lie flat position and moving to an upright position, that connects between the first mounting portion and section mounting portion and the fork mounting portion and rear wheel mounting portion, FIG. 13 Shows in a similar series of isometric views (a) through (g) a single unequal length parallelogram, FIG. 14 Shows the unequal length parallelogram in front on view moving in a series (a) to (f) from the lie flat position to the upright position, FIG. 15 Shows a further embodiment of the present invention in a plan isometric view, FIG. 16 Shows an underside of the fork receiving portion and the fork mounting portion in the straight ahead position, showing a locking mechanism between the two, and FIG. 17 Shows a similar view to that of FIG. 14, but with the fork receiving portion rotated and the locking mechanism unlocked.

Preferred embodiments will now be described with reference to FIGS. 1 through 17.

A bicycle carrying rack 1 is shown for mounting to a load carrier 3 of a vehicle 4 to hold a bicycle 23 in either an upright (first position) or laid over (second) position as shown in FIGS. 1 through 17.

The bicycle carrying rack 1 consists of a first mounting portion 2 which connects to the load carrier 3 of a vehicle 4 in a known way. For example the load carrier 3 may be the cross members (shown in FIG. 8A) of a roof rack or similar of a vehicle. The first mounting portion 2 has a connection or connections to allow it to mount to the load carrier.

Figure 5:
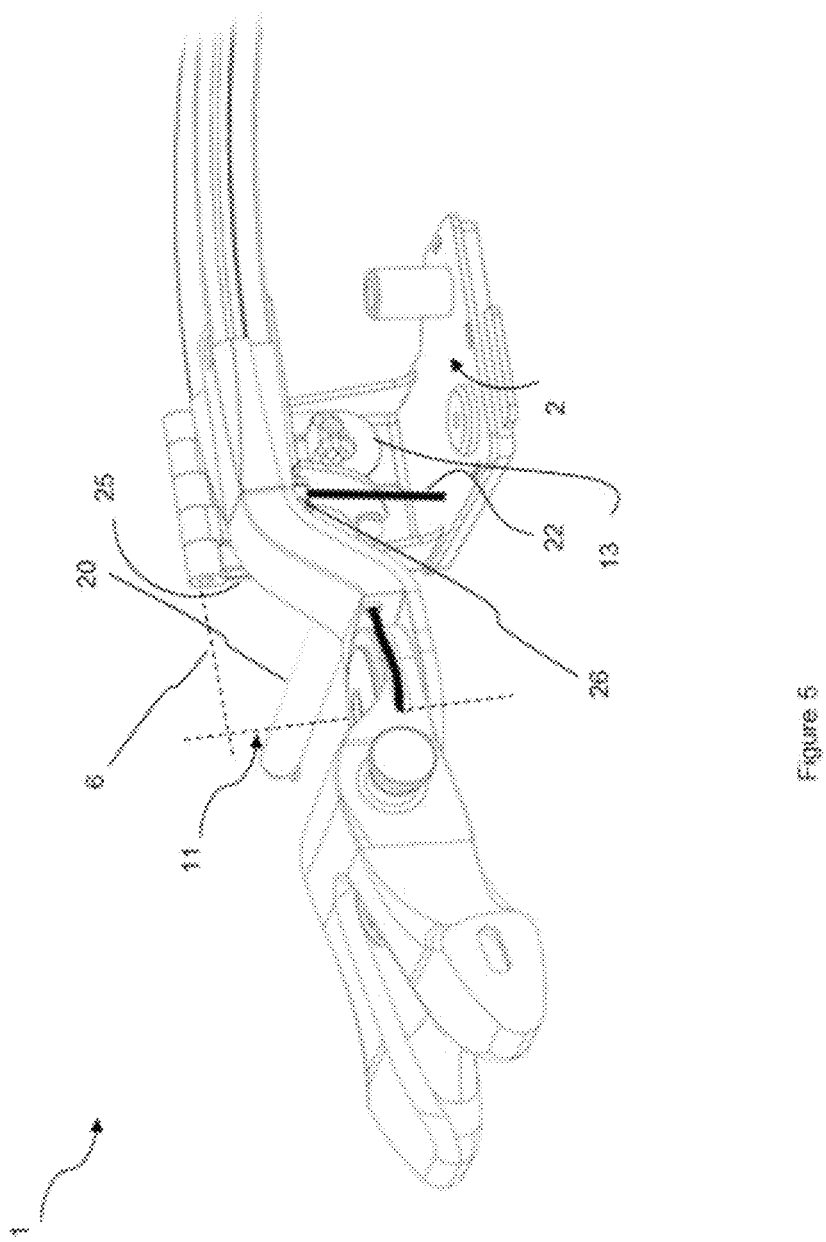
Figure 6:
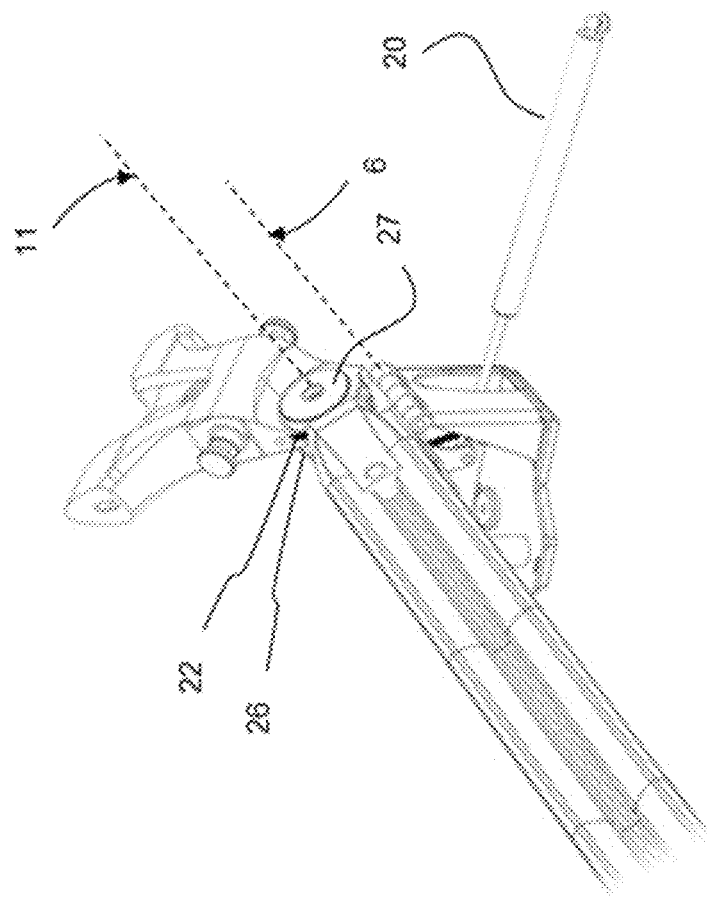

Pivotally mounted from the first mounting portion 2 is the fork mounting portion 5. As shown, for example in FIG. 5, a hinge 25 is present to pivotally connect the fork mounting portion 5 to the first mounting portion 2. The hinge 25 allows the fork mounting portion 5 to pivot from the first position 8 shown in FIG. 5 through to the second position 12 shown in FIG. 7 (and the midway position as shown in FIG. 6) about the first axis 6.

Figure 7:
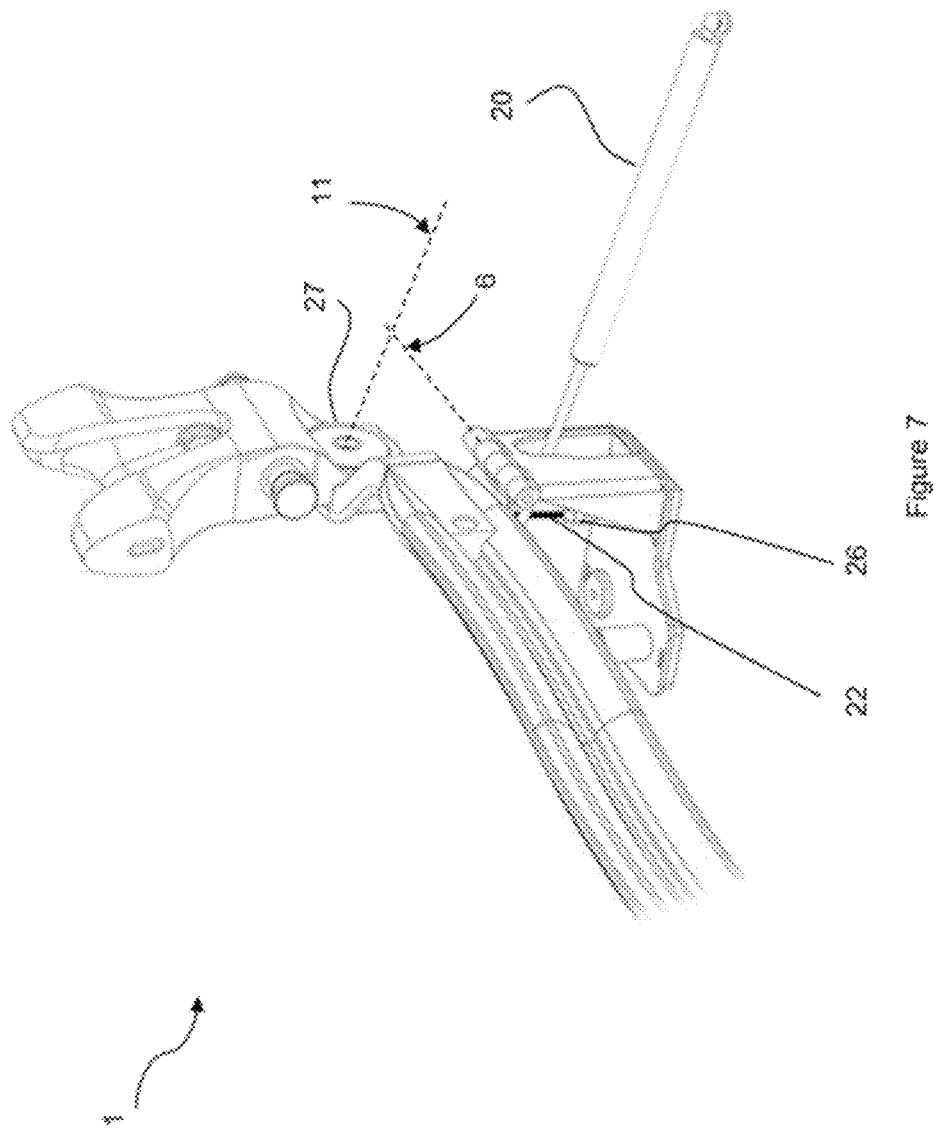

Rotationally mounted from fork mounting portion 5 is the fork receiving portion 7. The fork receiving portion 7 can rotate relative the fork mounting portion 5 about the second axis 11 as shown in FIGS. 5 through 7. The fork receiving portion may have differing lengths available or be adjustable between where it attaches to the fork and where it rotates about the second axis 11, to allow for varying fork offsets.

The rotation of the fork receiving portion 7 relative to the fork mounting portion in the preferred form is controlled at least as it moves from the first position (FIG. 5) to the second position (FIG. 7), and any position there-between by a motion control apparatus 21. One preferred form of this is to use a flexible tensile member 22 connected between the first mounting portion 2 and the fork receiving portion 7 via the fork mounting portion 5 referring to FIG. 8B, Looking at FIGS. 8B and 8C the flexible tensile member is shown preferably connected to the first carrier portion 2. However, any stationary part of the bicycle rack relative the fork mounting portion 2 and fork receiving portion 7 will suffice. The flexible tensile member 22 then extends up through and over the bearing point 26 pivotally located on the fork mounting portion. In the preferred embodiment the bearing point 26 is a pulley as shown, to reduce friction. However, any device that allows relative movement of the flexible tensile member 22 will suffice. In the preferred form the member 22 then continues and connects to the fork receiving portion 7 to bear on it in a direction tangential to the second axis 11.

The result is that when the fork mounting portion 5 rotates about the first axis 6, from the first position to the second position, the flexible tensile member 22 pulls on the first mounting portion 2 and the fork receiving portion 7. As the fork receiving portion 7 can rotate about the second axis 11, when the flexible tensile member 22 pulls on it the fork receiving portion 7 will then be caused to rotate.

In the preferred form the member 22 is continuous, but in other forms may be multipart. Other forms of motion control apparatus may be used also such as geared connections, or combinations of geared and flexible connections—a person skilled in the art would understand how such could be implemented. The motion control apparatus as described in the preferred form controls rotation of the fork receiving portion 7 when moving from the first position to the second position. However in other forms it may simply allow an unlocking of the fork receiving portion 7 to allow it to rotate naturally relative to the fork mounting portion.

In one preferred form there is a biasing means (not shown) to urge the fork receiving portion 7 rotationally back from the turned position (as shown for example in FIGS. 8B and 8C) to the straight-ahead position (for example as shown in FIG. 8A). In one preferred form this biasing means maybe a spring urging this rotation. The spring may be a spiral wound spring located about the second axis pivot 27, or may be a coil spring in tension on the other side of the second pivot axis 27 to the flexible connecting member 22. Alternatively it may be a coil spring acting in compression on the same side as the flexible tensile member 22. In these cases the biasing means acts between the fork receiving portion 7 and fork mounting portion 5. In another form the flexible tensile member 22 may be anchored to the fork receiving portion 7 but extend round the second axis pivot to be acted on by a biasing means. Such biasing means is in tension or compression and acts on the flexible tensile member and acts against rotation of the fork receiving portion when moving from the first position to the second, and acts with the rotation of the fork receiving portion when moving in the opposite direction. In other forms the flexible tensile member, or another flexible tensile member extends from the fork receiving portion 7 and is anchored in a location to pull against the fork receiving portion 7 to rotate it when moving from the second position to the first position (in a similar but opposite way to how the flexible tensile member 22 acts as described above when causing the fork receiving portion 7 to rotate when moving from the first position to the second position).

In another form there may be no control of rotation of the fork receiving portion at least when moving from the second position to the first position and it may simply rotate under the present weight of the fork and handle bars of the bicycle. In less preferred forms there may also not be control of rotation when moving from the first position to the second position.

Figure 9:
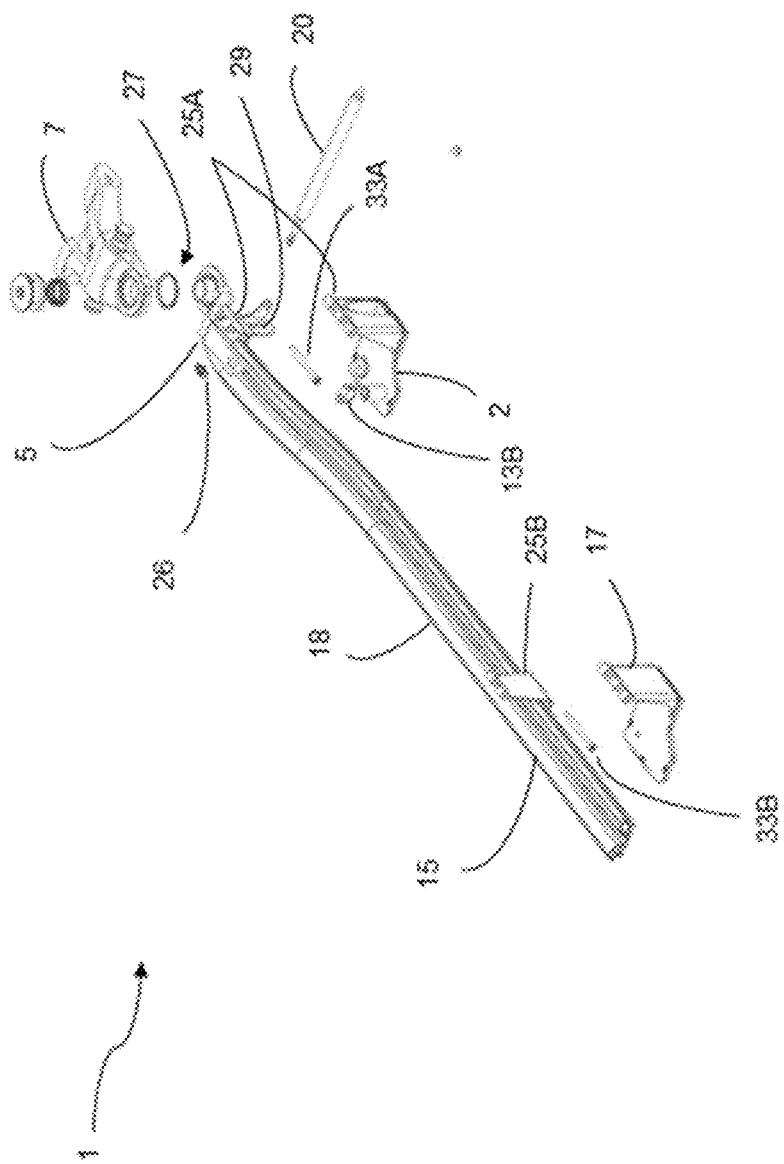
Figure 10:
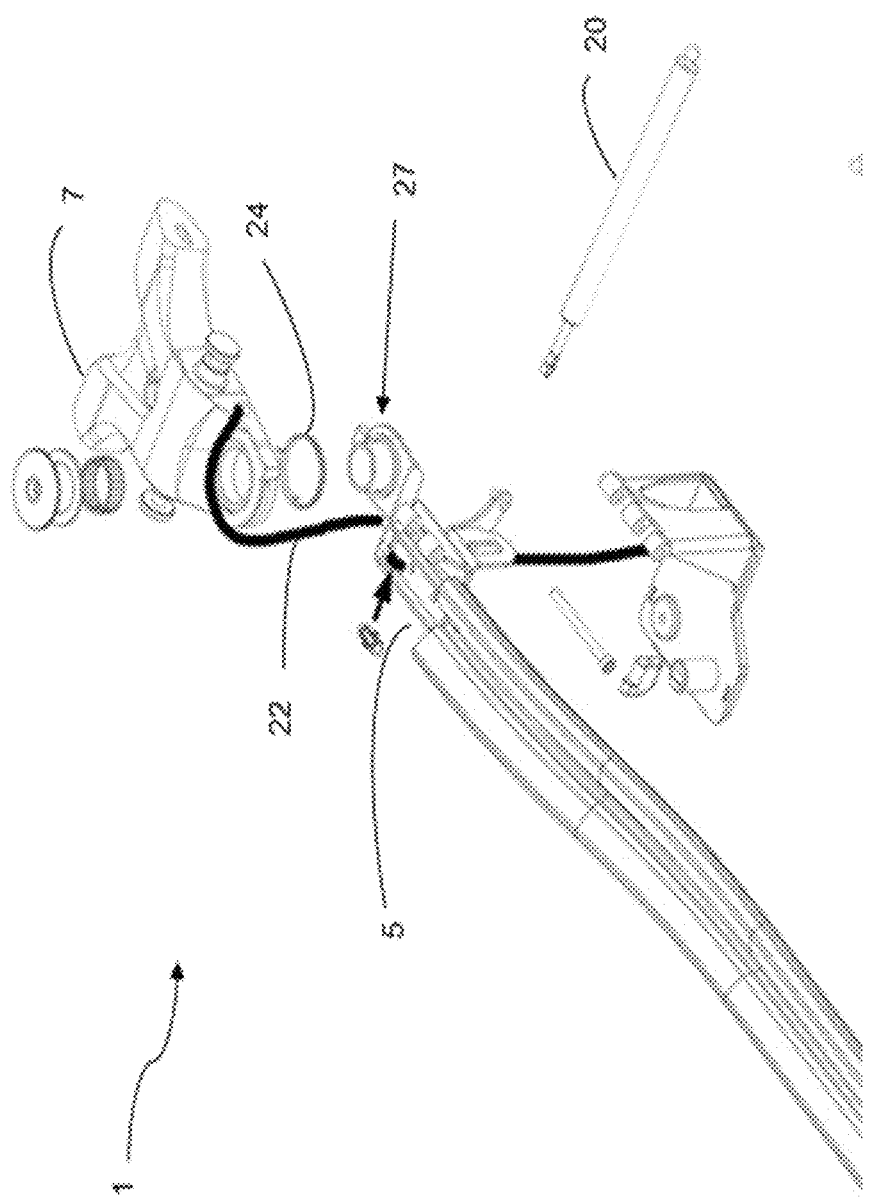
Figure 11:
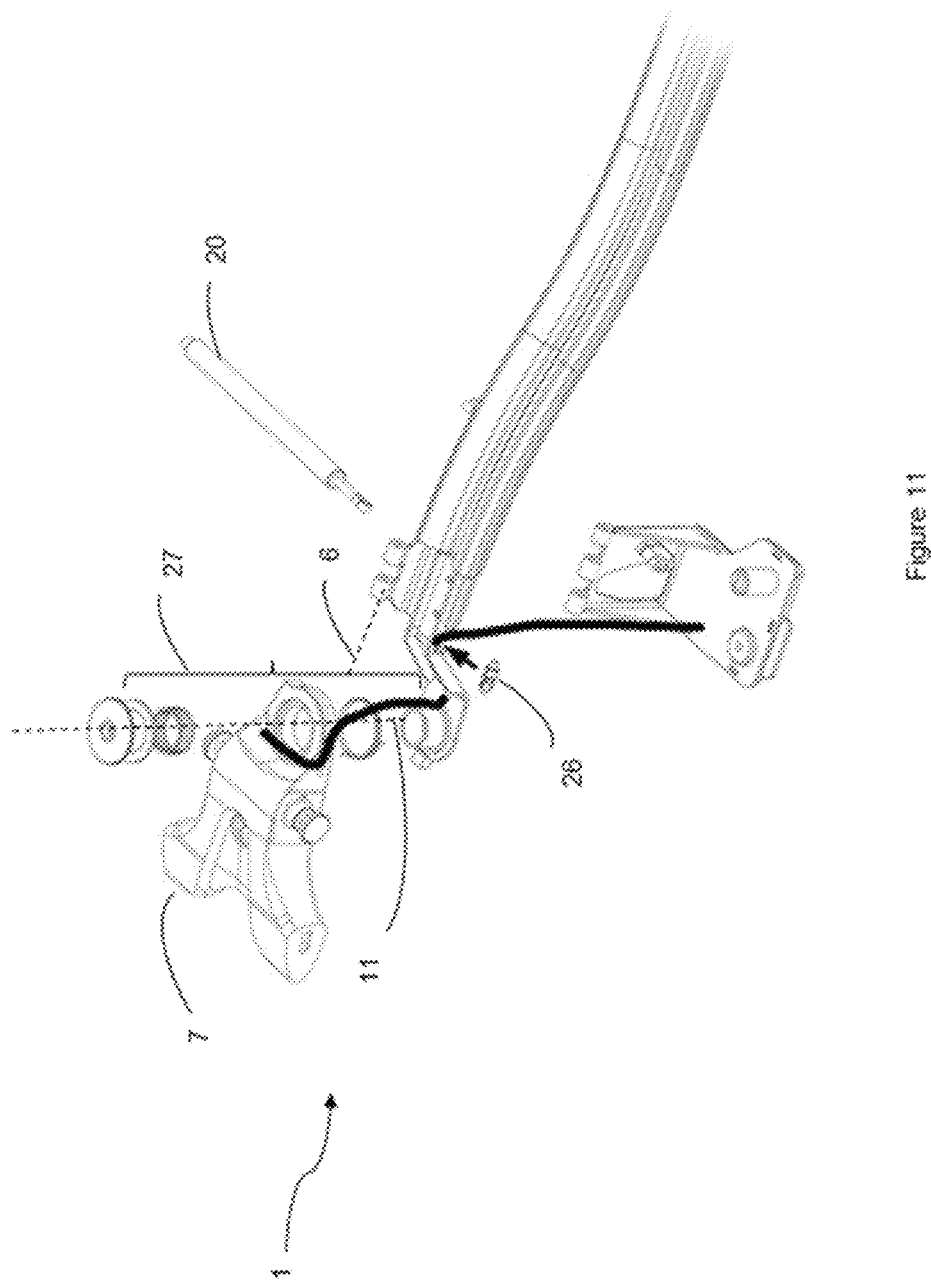

Exploded diagrams in FIGS. 9 through 11 show the location of the flexible tensile member 22 and also the biasing means 24. The hinges 25A and 25B also are shown disassembled including the hinge pins 33A and 33B. A pivot pin 34 is also shown for the pulley that forms the bearing point 26. The second axis pivot 27 is also shown—there may also be a friction reducing interface where the fork mounting portion 5 receives the fork receiving portion 7 and the second axis pivot 27, for example a bearing surface of some kind such as a brass, bush or needle and cage bearing or similar.

Shown in FIG. 11 is an energy dissipation device 20. This may be gas, hydraulic or other device that damps motion and may also have a biasing component to it (for example a compressed gas or spring). In FIGS. 1 through 7 the device 20 acts below the first axis 6, and in FIG. 8 it acts above the first axis 6. In one form as shown in FIGS. 1 through 7 the device has a mount 28A separate from the first mounting portion 2. However in FIG. 8 it is shown having a mount 28B integrated with the first mounting portion 2. In the preferred form the energy dissipation device 20 urges the fork mounting portion 2 to or towards the first position to resist the natural weight of the bicycle 23, and damps motion in both directions, but preferably when moving from the first position to the second position. This helps control lying the bicycle 23 to or towards the second position so it moves gradually, and helps counteract the weight of the bicycle 23 when moving back to the first position.

Figure 8:
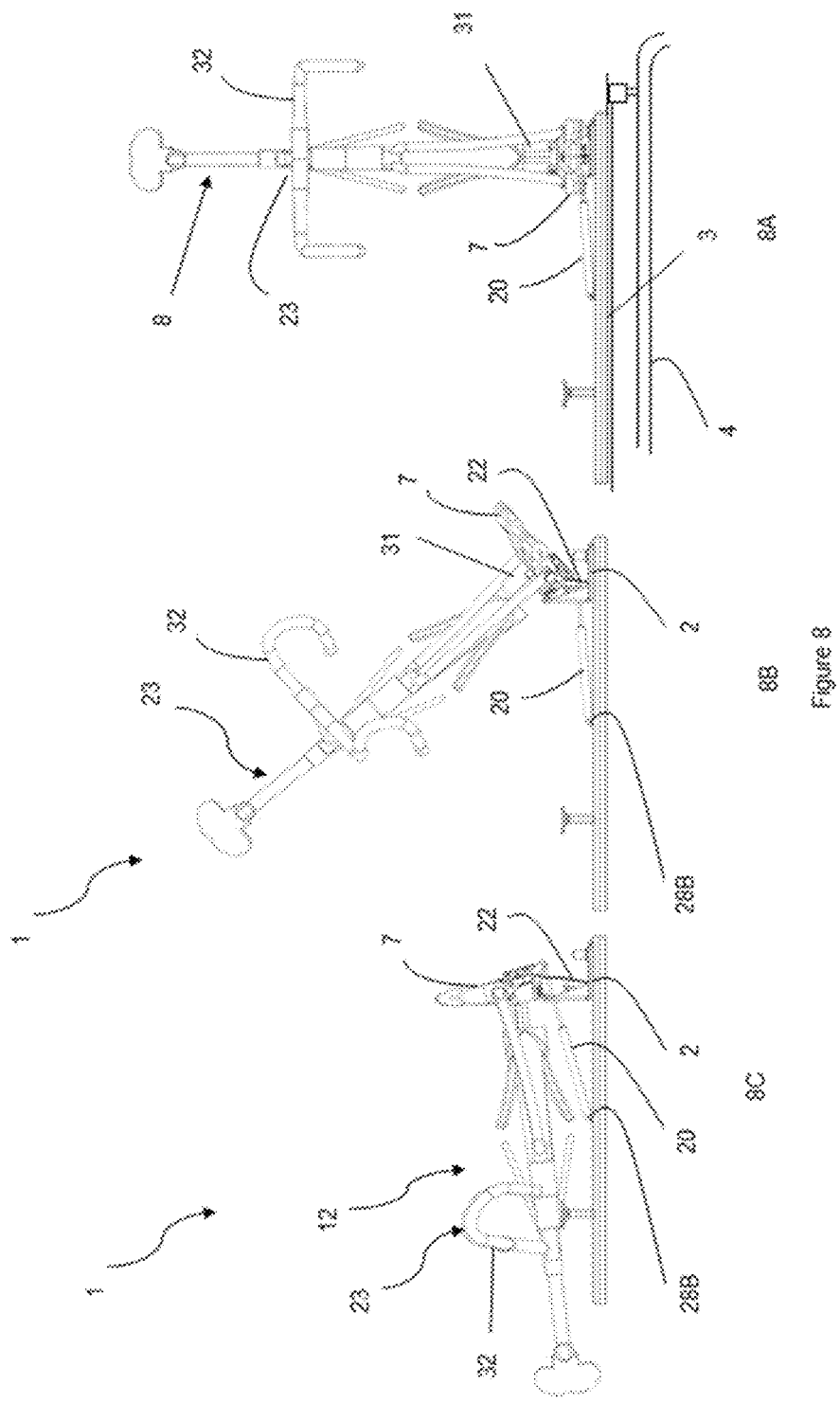

Present also is a lock 13, as shown in FIGS. 5 and 8. The lock retains the fork mounting portion 5 (and bicycle 23 if mounted) in the first position. When unlocked it allows the carrier to move from the first position to the second position. In the preferred form the lock 13 acts between the first mounting portion 2 and the fork mounting portion 5, though any way to lock rotation is acceptable. In the preferred form the lock 13 consists of a locking portion 13A on the fork mounting portion 5 and a locking portion 13B on the first mounting portion 2. In the form shown in FIGS. 3 and 8, 13A has a slot 29 and 13B is a lock bolt 30 captured in the slot 30. When tightened down the lock bolt 30 holds the fork mounting portion 5 to the first mounting portion 2 so the two cannot move relative each other. Should a user desire to move to the second position the lock bolt 30 for example is undone and can then pivot out of the slot 29 to allow movement to or toward the second position. The lock is preferably at least resilient enough to hold the carrier in the first position when a bicycle 23 is mounted there on and carried by the vehicle.

The fork 9 of the bicycle 23 is held by the fork receiving portion 7. In the preferred form this is a clamping of the dropouts of the fork 9 by the wheel axle passing through a wheel axle receiving portion 42 on the fork receiving portion. The drop out may be a standard quick release (9 or 10 mm in diameter), or may be a through axle such as 10 mm, 12 mm, 15 mm or 20 mm as is known in the bicycle art.

The connection between the fork 9 and the fork receiving portion 7 in the preferred form is one that allows relative rotation between the two. This is because the axis of the headset of the bicycle is not co-linear with the second axis 11. Therefore there needs to be relative rotation between the fork 9 and fork receiving portion 7 to account for this misalignment when moving from the first position 8 to the second position 12 as shown in FIGS. 8A, 8B and 8C. Alternatively the angle of the second axis 11 may be adjustable to account for this to ensure it is aligned to the axis of the bicycle headset.

In one configuration the fork receiving portion 7 may be mounted directly to the first mount portion via a multi-axis hinge, for example a ball and socket joint. This allows rotation about the first axis 6 and second axis 11 and a third axis (perpendicular to the first axis) to account for misalignment of the second axis 11 and the headset axis. The fork mounting portion 5 may still be present if needed in this configuration.

Figure 2:
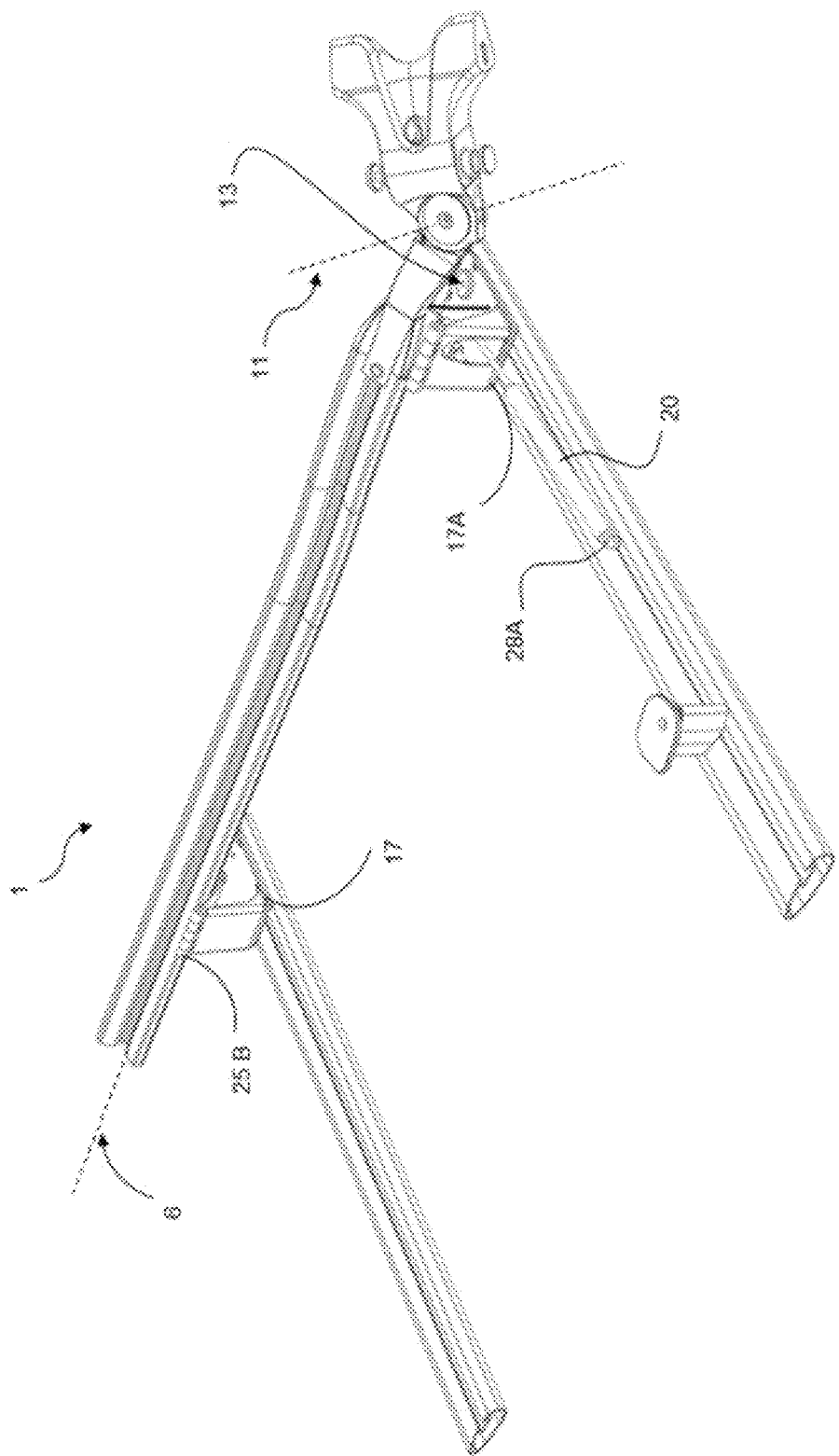
Figure 3:
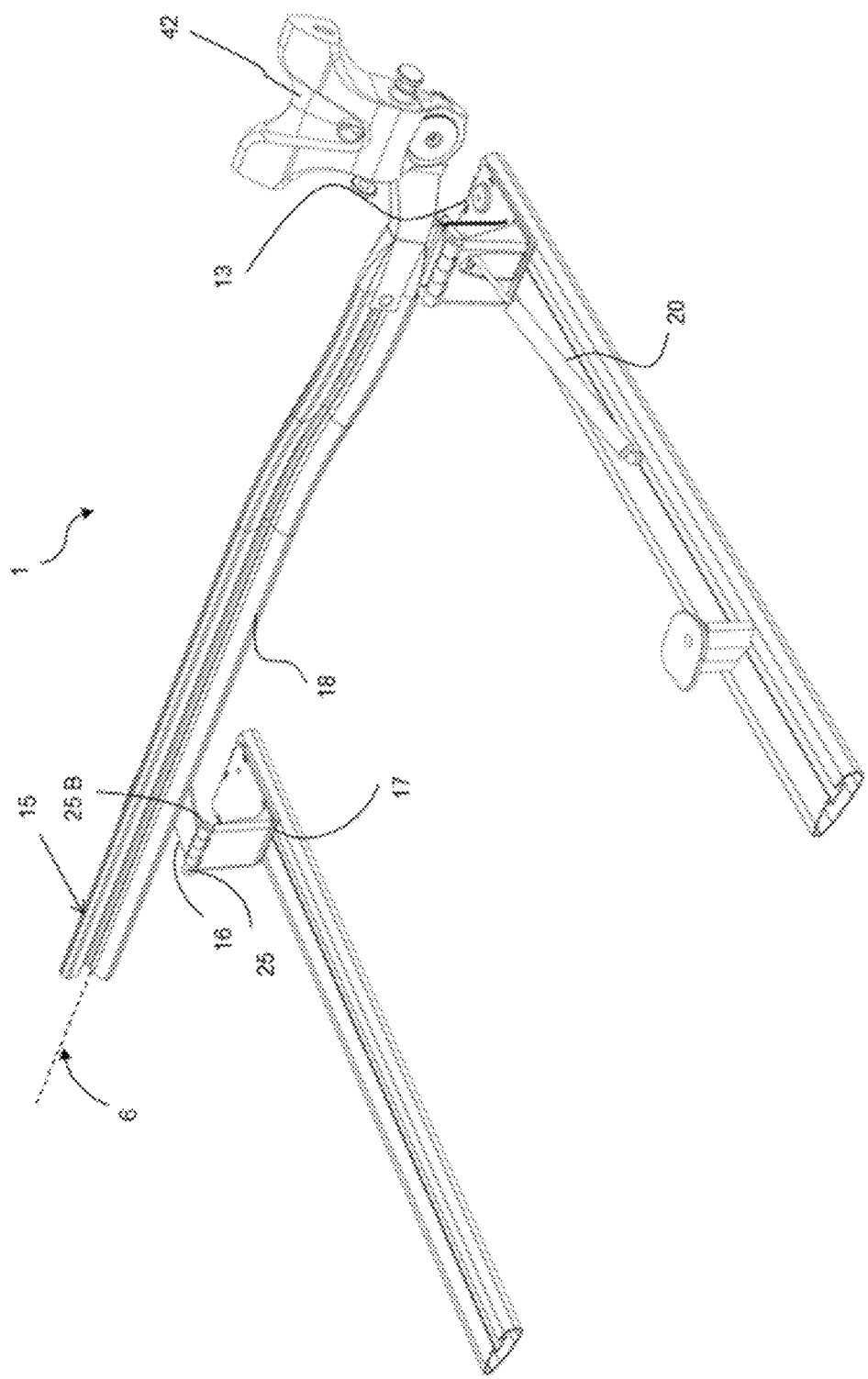
Figure 4:
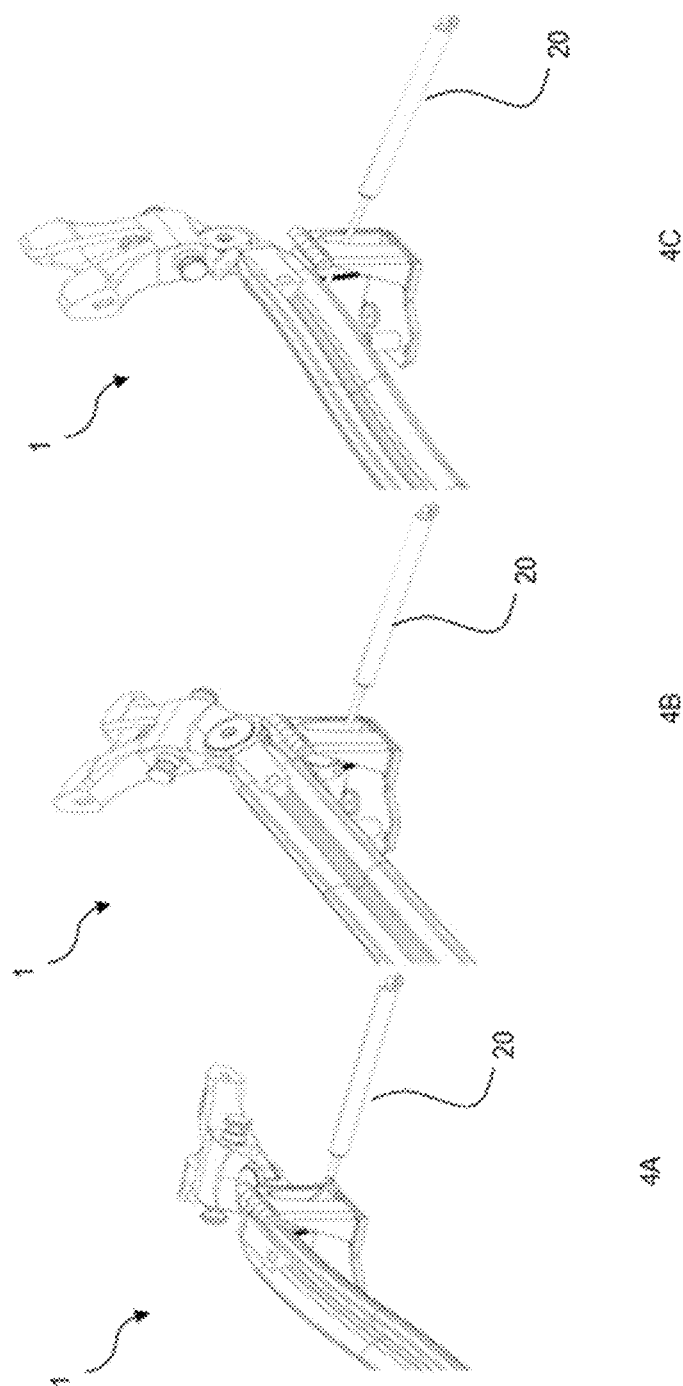

Normally such bicycle carriers also require a further mount to lock the bicycle carrier to the load carrier, for example a pair of roof bars on a vehicle, where the first mounting portion connects to one roof bar of the load carrier 3A and a second mounting portion 17 connects to a second roof bar of the load carrier 3B as shown in FIG. 1. To this end the second mounting portion 17 is also pivotally connected to a rear wheel receiving portion 15 of the rack 1. Again this mounting allows pivoting about the first axis 6 via hinge 25B a as shown in FIGS. 1 through 3. As shown this hinge 25B may simply be a machining out of an extrusion that forms the rear wheel mounting portion 15 and elongate connecting member 18 (described below). Likewise with the first mounting portion 2 there may be an energy dissipation device 20 to also control the rear wheel area—for example if the rear wheel receiving portion is not connected to the fork mounting portion 5, or the bicycle to be carried is heavy, for example an enduro style bike, or e-bike, or a downhill bike. Alternatively the energy dissipation device 20 may be located on the rear only.

Figure 12:
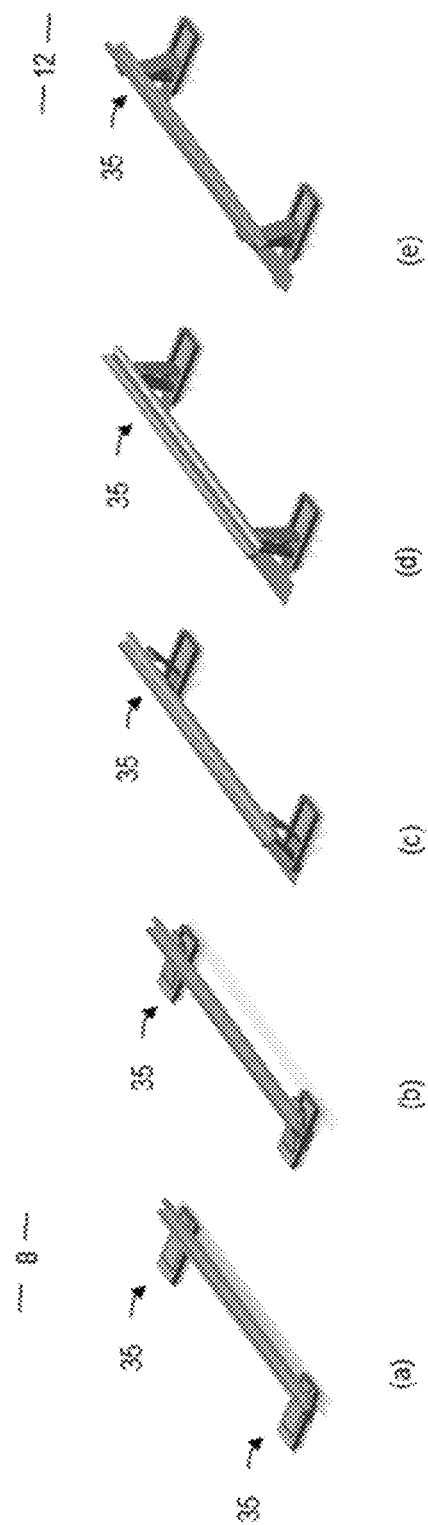

In a preferred form the hinges 25A and 25B are elevated hinges as shown in FIGS. 1, 9 and 12. The reason for this is to provide greater clearance for the pedals of the bicycle 23 when it is in the second position, so the pedals do not contact the roof of the vehicle 4.

The rear wheel receiving portion 15 in the preferred form receives and mounts the rear wheel 31 of the bicycle as shown in FIGS. 8A and 8B. However, in other forms it may also connect using a bracket or similar to the rear drop outs of the bicycle if needed. In the preferred form the rear wheel receiving portion 15 is channel shaped to accept the rear wheel 31. The rear wheel may be held there using known techniques, such as a strap. In the preferred form the rear wheel receiving portion 15 has an elongate connecting member 18 to connect it to the fork mounting portion 5, such as shown in FIGS. 5 through 7. The rear wheel receiving portion 15 is also mounted by a hinge 25 mounted to a second mounting portion 17, similar to how the fork mounting portion is to the first mounting portion 2. In this way the rotation movement of the rear wheel receiving portion 15 is controlled to move with the fork mounting portion 5 when moving to and from the first and second positions. This also allows for easy installation and removal and storage of the rack as all the main parts are held together.

Figure 13:
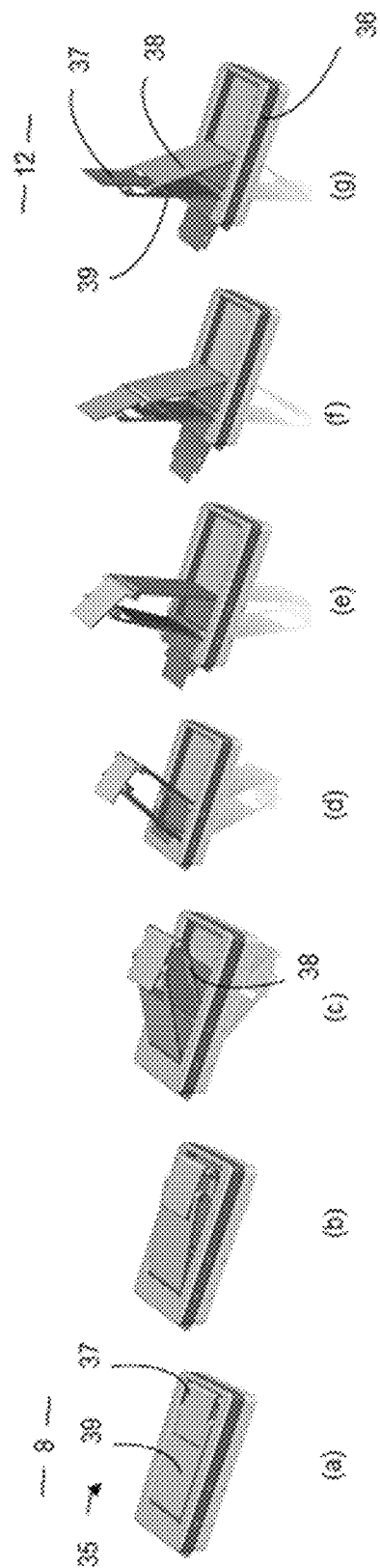

A variation of the hinge 25 for the between the first mounting portion 2 and the fork mounting portion 5, and the second mounting portion 27 and the rear wheel receiving portion 15 is shown in FIGS. 12 through 14. In this case the hinge 25 is an unequal length parallelogram 35. The unequal length parallelogram 35 in the preferred form consists of a base 36 which mounts to the vehicle load carrier, a top 37 which mounts to the fork mounting portion or rear wheel receiving portion, and a short arm 38 and a long arm 39.

In the first position as shown in FIGS. 12*a* through 14*a* the unequal length parallelogram 35 lies substantially flat and as shown largely contained within the base 36, and the bicycle in this orientation would be vertically oriented.

The unequal length parallelogram 35 can them move from the first position in 12*a* through 14*a*, the second position shown in 12*e*, 13*g*, and 14*f* in which it is upright. In this position the top 37 is now extended and importantly is now at substantially at a right angle to the base 36. In this second position the bicycle will have been rotated through 90 degrees and is now lying in a substantially horizontal position.

In this way the earlier described hinge 25 can be considered a concentric hinge about the first axis 6, and the unequal length parallelogram, whilst also rotating about the first axis 6 does so in a non-concentric manner.

Again like the single axis hinge earlier described fork receiving portion is actuated to rotate the forks from straight ahead in the first position, to approximately 90 degrees in the second position.

In use the user mounts the rack 1 in known ways to a load carrier. If necessary to accommodate the bicycle the user may add spacers (not shown) between the rack 1 and the load carrier 3. This may allow for location of a bicycle 23 in the second position 12 without obstructing various components, for example if the pedals of the bike would otherwise strike the roof of the vehicle, then spacers are added to remove or reduce the chance of striking—alternatively as earlier described the hinges 25A and 25B may allow for this by having an increased height, at least when in the second position, such as the unequal length hinge described.

The rack may be configurable to account for the many different load carrier mounting systems presently and in future, that may be available. The mount or mounts 28A, for the energy dissipation device(s), if separate, are mounted also, in the known ways. The rack 1 is locked in the first position.

A user then removes the front wheel of the bicycle 23 and lifts it onto the rack 1. Then in whichever order they prefer they can connect the rear wheel to the rear wheel receiving portion 15 and the fork 9 to the fork receiving portion 7, or vice versa. Once locked to each portion the user can then elect to carry the bicycle in the first position 8, substantially vertically, or may lie the bicycle down in or toward the second position 12.

It should be understood that not all bicycles may adapt to being carried horizontally, they may get near that plane, but not fully lie in that plane for several reasons. For example they may be too bulky and may have parts that interfere with a component of the load carrier or vehicle, for example a pedal may hit the roof. Other bicycles may not allow full rotation of the fork, for example a downhill bike that has dual triple clamps for the fork, such that the stanchions of the fork hit the frame of the bicycle when rotated.

If they choose to carry in the first position then they are done with loading the bicycle.

If they choose to lay the bicycle at or toward the second position 12 then they simply disengage the lock 13, and allow the bicycle to move in a controlled fashion to the second position 12—if present then unlocking of the lock bolt 40 (described below) will also be required. This may be done as two separate actions, but it is envisaged the two could be undone with one mechanism. As they lie the bicycle over toward the second position the fork receiving portion rotates the fork proportionally. In this way any handlebar 32 of the bicycle 23 is rotated to its least cumbersome position, see FIGS. 8A to 8B.

When at the desired position the user may lock the bicycle in that position. Again either using a lock that may hold it at whatever angle is desired, or they may strap a part of the bicycle to one or both of the load carrier roof bars 3A or 3B. For example with a road bike they could strap the seat to the bar 3B, or other support (not shown) from the load carrier 3.

Another form of lock bolt 40 for the bicycle carrying rack 1 is shown in FIGS. 15 through 18, where like numbers indicate like features from earlier embodiments. In this embodiment the lock bolt 40 locks the relative rotation of the fork receiving portion 7 to the fork mounting portion 5. As seen in FIG. 15, and more closely in FIG. 16 the lock bolt 40 holds the two in the first position.

The lock bolt 40 in its most simple form is sprung loaded to engage a complimentary recess in the form mounting portion 5. A user may use their hands to disengage the lock bolt 40 from the complimentary recess 41 so the two are free to rotate to or towards the second position as shown in FIG. 17. In the embodiment shown there is no complimentary recess for the lock bolt 40 when in the second position. However, in other embodiments there may be to allow further locking in the second position.

The lock bolt 40 may work independently or in conjunction with the lock 13 earlier described.

In other embodiments the lock bolt 40 may be activated or release by a key, lever or similar release mechanism which may be more easily accessed.

The bicycle is now in, or towards position two where it offers the least wind resistance and more importantly its lowest position to allow access to a garage, carpark or other low overhead location.

To remove the bike, the user undoes the lock of the bicycle in the second position and returns it to the first position, and then reverses the process of securing it to the carrier 1. They can then mount the front wheel and they are completed.

The foregoing description of the invention includes preferred forms thereof. Modifications may be made thereto without departing from the scope of the invention.

The invention claimed is:

1. A bicycle carrying rack adapted for mounting to, or from, a vehicle, comprising or including:
   a first mounting portion to connect to a load carrier of the vehicle,
   a fork mounting portion including a fork receiving portion, the fork mounting portion rotationally mounted about a first axis from the first mounting portion, the fork receiving portion to receive and lock to a fork of the bicycle, wherein the fork mounting portion has,
   a first position adapted to locate the bicycle when mounted thereto, in a substantially vertical position, with the fork aligned in a substantially straight ahead position relative a major plane of the bicycle, and
   a second position adapted to locate the bicycle when mounted thereto, in or toward a horizontal position, with the fork aligned at an angle turned away from the substantially straight ahead position,
   during which movement from the first position to the second position the fork receiving portion rotates about a second axis to rotate the fork away from the substantially straight ahead position, and vice versa when rotated from the second position to the first position, and
   at least one lock to lock the bicycle at least in the first position,
   such that a bicycle can be carried in either said first position or said second position.

2. A bicycle carrying rack as claimed in claim 1 wherein the first axis lies in or is parallel to the major plane.

3. A bicycle carrying rack as claimed in claim 1 wherein the fork receiving portion rotates about a third axis substantially perpendicular to the first axis.

4. A bicycle carrying rack as claimed in claim 1 wherein there is a rear wheel mounting portion to receive and lock a rear wheel of the bicycle.

5. A bicycle carrying rack as claimed in claim 4 wherein the rear wheel mounting portion is rotationally mounted about the first axis from a second mounting portion connected to the load carrier of the vehicle.

6. A bicycle carrying rack as claimed in claim 4 wherein the rear wheel mounting portion is connected to the fork mounting portion by an elongate connecting member.

7. A bicycle carrying rack as claimed in claim 1 wherein rotation about the first axis is a concentric or nonconcentric rotation.

8. A bicycle carrying rack as claimed in claim 1 wherein the first mounting portion and second mounting portions are connected to the respective fork mounting portion and rear wheel mounting portion by an unequal length parallelogram hinge to rotate non-concentrically about the first axis.

9. A bicycle carrying rack as claimed in claim 8 wherein the unequal length parallelogram hinge lies substantially flat in the first position.

10. A bicycle carrying rack as claimed in claim 8 wherein the unequal length parallelogram hinge lies upright in the second position, and due to the unequal length rotates the fork mounting portion and rear wheel mounting portion non-concentrically about the first axis in to the substantially horizontal position.

11. A bicycle carrying rack as claimed in claim 1 wherein the fork is held via a wheel axle receiving portion of the fork.

12. A bicycle carrying rack as claimed in claim 1 wherein the movement from the first position to the second position is controlled by an energy dissipation device.

13. A bicycle carrying rack as claimed in claim 1 wherein there is a motion control apparatus to move the fork receiving portion from the straight-ahead position to the turned away position.

14. A bicycle carrying rack as claimed in claim 13 wherein motion control apparatus is a flexible tensile member mounted between the first mounting portion and the fork receiving portion via a sliding connection on the fork mounting portion, such that as the fork mounting portion rotates from the first position to the second position the flexible tensile member pulls on the fork receiving portion to cause it to rotate.

15. A bicycle carrying rack as claimed in claim 13 wherein the motion control apparatus is a geared connection between the first mounting portion, directly or indirectly to the fork receiving portion.

16. A bicycle carrying rack as claimed in claim 14 wherein there is a biasing means to act at least in part against the action of the motion control apparatus.

17. A bicycle carrying rack as claimed in claim 1 wherein the fork receiving portion rotates back to the straight-ahead position under the weight of the fork and handle bars of the bicycle.

18. A bicycle carrying rack as claimed in claim 1 wherein the second axis is parallel to, or in, the major plane of the bicycle and not parallel to the first axis.

19. A bicycle carrying rack, adapted for mounting to or from a vehicle, comprising or including,
   a fork receiving portion, adapted to mount to or from a vehicle load carrier and adapted to connect to and hold a fork of a bicycle,
   wherein the fork receiving portion allows the bicycle to be held in a first position with the bicycle substantially vertical, and a second position with the bicycle in or toward a horizontal position,
   and wherein the fork receiving portion can rotate the fork of the bicycle away from a straight-ahead position when in the first position, as it moves to the second position.

20. A bicycle carrying rack as claimed in claim 19 wherein the fork receiving portion can be oriented to have a second axis about which it rotates match a steering axis of the fork.

21. A bicycle carrying rack as claimed in claim 19 wherein there is a fork mounting portion between the fork receiving portion and the vehicle load carrier.

22. A bicycle carrying rack as claimed in claim 21 wherein there is a first mounting portion connected between the vehicle load carrier and the fork mounting portion.

23. A bicycle carrying rack as claimed in claim 22 wherein the fork mounting portion is rotationally connected to the first mounting portion to allow rotation about the first axis.

24. A bicycle carrying rack as claimed in claim 23 wherein the fork receiving portion is rotationally connected about the second axis to the fork mounting portion.

25. A bicycle carrying rack as claimed in claim 22 wherein the fork receiving portion is operationally connected to a rear wheel receiving portion.

26. A bicycle carrying rack as claimed in claim 25 wherein the operational connection is via the fork mounting portion.

27. A bicycle carrying rack as claimed in claim 25 wherein the operation connection is via an elongate member between the rear wheel receiving portion and the fork mounting portion.

28. A bicycle carrying rack as claimed in claim 22 wherein there is a bracket to connect a rear wheel dropout of the bicycle to a rear wheel receiving portion in the absence of the rear wheel.

29. A method of mounting a bicycle to a vehicle load carrier on, or for, a vehicle, comprising:
 obtaining a bicycle carrying rack in accordance with claim 1,
 connecting the fork of the bicycle to the fork receiving portion of the fork mounting portion, which in turn is pivotally connected to the vehicle load carrier; and
 connecting a rear wheel, or rear portion of the bicycle to a rear wheel mounting portion that is also pivotally connected to the vehicle load carrier, such that the bicycle is carried in a substantially upright position with the fork in a substantially straight-ahead position.

* * * * *